United States Patent [19]

Chermak et al.

[11] 4,341,578
[45] Jul. 27, 1982

[54] METHOD OF HOSE PRODUCTION

[75] Inventors: Michael A. Chermak; Anil H. Chudgar; William J. Kronschnabel, all of Manitowoc, Wis.

[73] Assignee: Gould Inc., Rolling Meadows, Ill.

[21] Appl. No.: 230,123

[22] Filed: Jan. 30, 1981

Related U.S. Application Data

[63] Continuation of Ser. No. 961,338, Nov. 16, 1978, abandoned.

[51] Int. Cl.³ .............................................. B65H 81/00
[52] U.S. Cl. .................................. 156/149; 156/156; 156/172; 156/244.13; 156/275.1
[58] Field of Search ............... 156/149, 143, 156, 272, 156/244.12, 244.13, 172–175, 379.6, 379.7, 380.1; 264/103, 173; 138/127; 218/10.57

[56] References Cited

U.S. PATENT DOCUMENTS

| 3,944,453 | 3/1976 | Chudgar | 156/172 |
| 3,945,867 | 3/1976 | Heller et al. | 156/143 |
| 4,029,837 | 6/1977 | Leatherman | 156/175 |
| 4,102,724 | 7/1978 | Taylor | 156/149 |

Primary Examiner—Michael W. Ball
Attorney, Agent, or Firm—Russell E. Baumann; Edward E. Sachs; George P. Edgell

[57] ABSTRACT

A method of hose production and product wherein a thermoplastic core tube having an outer surface has applied thereto a metallic reinforcement equipped with interstices, the assembly thus achieved being heated in selected portions adjacent the outer surface of the tube to soften the tube for migration into the interstices and thereafter cooling the migrant portions to form a uniform mechanical interlock between the core tube and reinforcement and, further, a uniform mechanical interlock between the core tube, reinforcement and cover.

8 Claims, 8 Drawing Figures

METHOD OF HOSE PRODUCTION

This application is a continuation of application Ser. No. 961,338, filed Nov. 16, 1978, now abandoned.

BACKGROUND AND SUMMARY OF INVENTION

This invention relates to a method for producing a hose and, more particularly, a hose embodying a metallic reinforcement layer. The hose of the invention has a wide variety of applications but one widespread use is for the delivery of hydraulic fluid—as for example hydraulic systems for farm and construction equipment.

In recent years, the practice in the thermoplastic hose industry has been to use fibrous materials as the reinforcing layer such as polyethylene terephthalate polyester fibers known as "Dacron". More recently, aromatic polyamides such as "Kevlar" have been employed as the reinforcing layers in thermoplastic hoses. The reinforcement layer imparts strength and burst resistance to the hose. It is desirable to provide a reinforcement layer which provides substantial kink resistance in the hose and which is still satisfactorily flexible while yet providing the desirable reinforcement function.

A large number of different types of hose constructions have been developed over the years providing different desirable features and utilizing a wide range of materials. Further, a number of different techniques have been utilized for bonding the reinforcement layer to the outer surface of the core tube. A recent example of a reinforcement layer which is mechanically interlocked with the core tube is U.S. Pat. No. 3,944,453 of Chudgar et al. However, the teaching there required the use of a specially thermally formed, fused bonding layer.

Another example of a mechanically interlocked type of reinforced thermoplastic hose but which again requires a special layer is U.S. Pat. No. 3,945,867 of Heller et al.

Provided concurrently with the fibrous reinforcement type of thermoplastic hose have been rubber hoses equipped with metallic or wire reinforcements. Illustrative of the teachings of wire reinforced rubber hose is U.S. Pat. No. 3,776,794 of Ingham. There, the core tube must be first supported by an internal mandrel and thereafter must be cured.

In some instances metallic reinforcements have been provided on core tubes constructed of materials other than rubber (such as thermoplastics) but the bond has either been nonexistent or very poor. It is to this last form of hose to which the invention is directed, i.e., the production of a hose wherein a metallic reinforcement is mechanically interlocked with a thermoplastic core tube and advantageously also, to the cover.

According to the invention, the thermoplastic core tube has an outer surface to which is applied an intersticed metallic reinforcement, after which the core tube is heated in selected portions adjacent its outer surface (as by induction heating) so as to soften the portions adjacent the outer surface for migration into the interstices. Thereafter, the migrant portions are cooled to form a uniform (i.e., solvent-free) mechanical interlock between the core tube and the reinforcement. The advantage of such an improved interlock which serves to maintain the integrity of the composite structure is to provide kink-resistance and better performance under pressure impulse conditions. When covered with material compatible with the core tube material, heat from the extruded cover softens the migrant portions to provide a fusion bond between the cover and the migrant portions.

Other objects and advantages of the invention may be seen in the details of construction and operation as set down in the ensuing portion of the specification.

DETAILED DESCRIPTION

The invention is described in conjunction with an illustrative embodiment in the accompanying drawing, in which—

Figure 1:
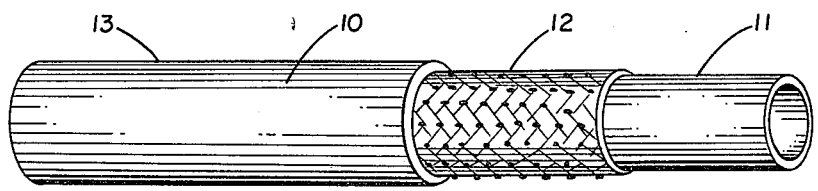
FIG. 1 is a fragmentary perspective view of a hose with portions cut away to illustrate basic components.

In the illustration given and with reference first to FIG. 1, the numeral 10 designates generally a hose which is made up of the conventional components of a core 11, a reinforcement 12 and a cover 13.

Figure 2:
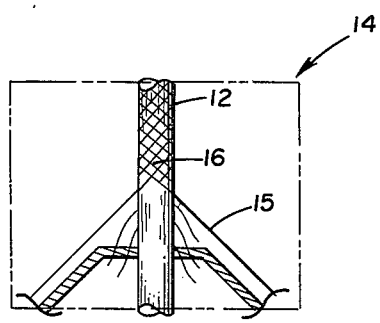
FIG. 2 is a fragmentary elevational view, essentially schematic, of a portion of a machine for applying a reinforcing layer to a core tube.
Figure 3:
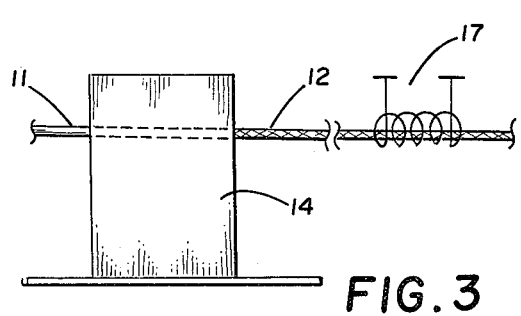
FIG. 3 is an elevational view, essentially schematic, of equipment employed in the practice of the invention.

The reinforcement 12 is advantageously applied to the core tube 11 by a braiding or spiral wrapping machine generally designated 14 (see FIG. 3). In the illustration given (see FIG. 2) the reinforcement is made up by braiding or spiral wrapping metallic wires 15 in a fashion so as to develop a plurality of interstices 16. In spiral wrapping, each set of wires remains in its own layer while in braiding there is a crossover of one wire set into the other. In any event, there is provided the plurality of interstices 16.

As seen in FIG. 3, the reinforced core tube 11, after issuing from the braiding machine 14, is passed through a heating coil generally designated 17 which is operative to heat selected portions of the core tube in the fashion illustrated in FIG. 3.

Figure 4:
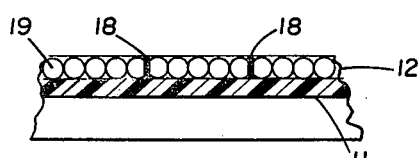
FIG. 4 is a fragmentary longitudinal elevational view showing a portion of the hose in the process of production according to the invention.
Figure 5:
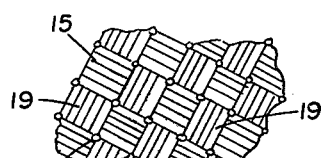
FIG. 5 is a fragmentary, perspective view of the exterior of the hose of FIG. 4.

Referring to FIG. 4 wherein only one wire layer is shown for clarity of illustration and ease of understanding, it will be noted that there are a number of projections 18 from the core tube which extend into the interstices between the various plaits or ribbons of the reinforcement layer 12. As seen in FIG. 5, a plait generally designated 15 consists of a plurality of strands 19—the projections 18 being the previously referred to migrant portions. It will be appreciated from a consideration of FIG. 5 that each reinforcement section will have usually two thicknesses of wire, i.e., strands 19—this irrespective of whether braiding or spiral wrapping is employed.

Figure 6:
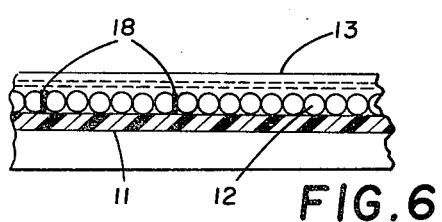
FIG. 6 is a view similar to FIG. 4 but showing the cover installed on the composite hose construction.
Figure 8:
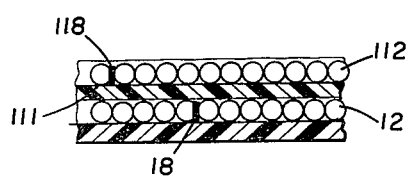
FIG. 8 is a view similar to FIG. 4 but of a modified form of the inventive hose.

In FIG. 6, a cover 13 is shown installed on the reinforced core tube 11. In normal practice, the cover is extruded over the reinforced core tube at a location physically separate from that where the braiding or spiral wrapping occurred. The heating (as at 17) may be immediately adjacent the braiding or spiral wrapping—or spaced downstream but still in line, or alternatively in a physically separate location also. Still further, the heating step may be performed after the cover is installed or at both times. Even further, multiple reinforcement sections may be employed as at 12 and 112 in FIG. 8. In such a case, after the first section has been applied to the core tube and heated as explained above to produce the projections 18, a film or sheet of thermoplastic material as at 111 is applied and another section of braid or spiral winding as at 112 applied thereover—and subjected to further heating to develop projections 118. In such case, the film or sheet must be compatible with the core tube material, i.e., develop a fusion bond therewith.

Figure 7:
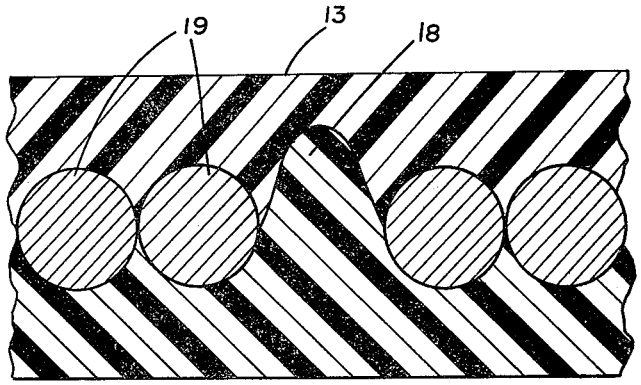
FIG. 7 is an enlarged fragmentary view of the hose of FIG. 6.

In FIG. 7, certain selected areas are again designated with the numeral 18 as illustrative of how the mechanical interlock exists in combination with an overlying cover 13. As pointed out previously, when the materials of the core tube and cover are compatible, there is fusion bonding between the two. A wide variety of materials may be employed in the practice of the invention. For example, the thermoplastic employed for the core tube 11 may be a polyester elastomer such as "Hytrel" manufactured by E. I. duPont de Nemours & Company, Inc. The same material may be employed for the cover or alternatively polyurethane or polyamide materials may also be employed in either or both instances.

Illustrative of the practice of the invention are the following examples:

EXAMPLE I

The core tube was a nominal ½" diameter 0.050" wall thickness Hytrel thermoplastic material. This was braided with 12 mil brass coated steel wire (seven strands per plait) employing a lead of 1.385. The thus braided core tube having relatively minute interstices was passed through a Lepel 2.5 KW induction generator operating at a frequency of approximately 300–400 KHz, a power setting of 95 and a grid setting of 67. The coil had a design of 10½ turns wound on a 1¼" I.D. The coil itself was 3/16" diameter Teflon coated copper tubing internally cooled by 80° F. deionized water in a closed circuit. The two-component hose was advanced through the induction generator at a rate of 8 feet per minute and was internally pressurized with air at a pressure of about 30 psi with slow bleed. Following removal of the reinforced tube from the induction generator, it was air cooled and a cover of 0.030" thick 80A hardness polyurethane was applied. Cooling resulted in a well bonded composite hose construction which was satisfactorily flexible, did not kink on bending, and had good performance under pressure impulse conditions, viz., S.A.E. J517. This hose, in addition to being light, was economical to produce and far surpassed S.A.E. 100R1 performance requirements. The interlock achieved also provides a significant advantage in preventing "flaring", viz., radial outward extension of the severed wires which interferes with the installation of couplings or connections. Normally, the coupling is designed for the hose O.D. and it is apparent that flaring would prevent ready assembly.

EXAMPLE II

The procedure of Example I was followed except that a nominal ⅜" diameter—0.045" wall thickness Hytrel thermoplastic core tube was provided. This finished hose had an I.D. of 0.385" and an O.D. of 0.580". The same type of reinforcement was applied and the interlocking was achieved through the same coil powered by the same generator. However, the bonding parameters included a speed of 14 feet per minute, and internal pressure of 50 psi with slow bleed, a power setting of 100 and a grid setting of 64. Thereafter, a 0.030" thick cover was applied as in Example I. The composite hose resulting from this example was equally satisfactory to that of Example I.

As indicated previously, a wide variety of materials of construction may be employed in the practice of the invention. More particularly, the invention is applicable to all polymers which soften and melt on heating. Exemplary of the core and cover materials are such thermoplastics as Nylon 11, Nylon 12, Polyester (duPont Hytrel), Polyurethane and thermally crosslinkable polymers which melt on heating and then crosslink.

In accordance with this invention, the core tube may be made of more than one layer fusion bonded together. For example, the first inside layer of the core tube may be made from "Hytrel" for chemical resistance and the second outer layer may be made from polyurethane for increased flexibility and material cost savings.

The type of reinforcement can be spiral wrap, braiding or other suitable type and the material of construction being brass coated steel wire, as illustrated above, or other metallic wire which gives desired strength to the hose and which can be heated by induction heating or other heating means, viz., resistance heating by a contact electrode or the like. In any case, the heating is advantageously confined to portions adjacent the outer surface of the core tube (or film or sheet in the case of multiple section reinforcement) so as to develop projections relative to the interstices of the reinforcement. When this is achieved by induction heating, the frequency may be advantageously in the range of 60 Hz to about 1 MHz. as contrasted to dielectric heating which employs frequencies ranging from 10 MHz up to the microwave region.

The amount of heating of the reinforcement layer is advantageously controlled by the coil design, speed at which the hose passes through the coil, the power level of the generator and the frequency of operation. We have found that it is particularly advantageous to control the amount of heat passing from the wire or other reinforcement form into the core tube by passing a cooling fluid therethrough and thus gaining the further advantage of simultaneously supporting the core tube internally against a potential collapse. As indicated previously, this can be achieved by introducing compressed air into the core tube 11 and maintaining the pressure as by constricting the downstream end of the core tube so as to permit a limited "bleed" of the compressed air. This results in a slight flow of compressed air which carries away excess heat and which otherwise might result in local distortion of the core tube and thus a defective final product.

The product produced according to the invention has a uniform core tube which is advantageously interlocked with the reinforcement layer. By uniform, we distinguish the type of interlock heretofore achieved through special layers, particularly those achieved through the use of solvents which normally leave at least traces so that the core tube is not uniform.

While in the foregoing specification a detailed description of the invention has been set down for the purpose of explanation, many variations in the details hereingiven may be made by those skilled in the art without departing from the spirit and scope of the invention.

We claim:

1. The method of continuous forming a hose product comprising the steps of:
   providing a single layer, thermoplastic, load bearing, core tube,
   applying an intersticed metallic reinforcement about said core tube;
   subsequently heating said core tube only in selected portions adjacent the outer surface thereof to soften said portions for migration into and above said interstices wherein said heating is done by heating of the metallic reinforcement by an induction generator thereby providing for only a localized heating effect; and
   cooling said portions to form a mechanical interlock between said core tube and said reinforcement, said mechanical interlock being the sole means bonding said reinforcement to said core tube.

2. The method of claim 1 in which said induction heating is performed at a frequency in the range of about 60 Hz to about 1 MHz.

3. The method of claim 2 in which said frequency is about 300–400 KHz.

4. The method of claim 1 in which said core tube is internally supported during heating thereof.

5. The method of claim 4 in which said support is provided by a pressure fluid.

6. The method of claim 5 in which said pressure fluid is compressed air.

7. The method of claim 6 in which said compressed air flows through said core tube to simultaneously support and cool the same.

8. The method of claim 1 in which a cover is extruded on the reinforced core tube and fusion bonded thereto.

* * * * *